(12) United States Patent
White et al.

(10) Patent No.: US 12,741,667 B2
(45) Date of Patent: Sep. 22, 2026

(54) SPATIO-TEMPORAL POSE/OBJECT DATABASE

(71) Applicant: Waymo LLC, Mountain View, CA (US)

(72) Inventors: Brandyn Allen White, Mountain View, CA (US); Aleksei Timofeev, Campbell, CA (US)

(73) Assignee: Waymo LLC, Mountain View, CA (US)

( * ) Notice: Subject to any disclaimer, the term of this patent is extended or adjusted under 35 U.S.C. 154(b) by 24 days.

(21) Appl. No.: 18/440,363

(22) Filed: Feb. 13, 2024

(65) Prior Publication Data

US 2024/0262385 A1 Aug. 8, 2024

Related U.S. Application Data

(63) Continuation of application No. 17/063,330, filed on Oct. 5, 2020, now abandoned.

(Continued)

(51) Int. Cl.

*B60W 60/00* (2020.01)
*B60W 30/095* (2012.01)

(Continued)

(52) U.S. Cl.

CPC ...... *B60W 60/001* (2020.02); *B60W 30/0956* (2013.01); *G05D 1/0088* (2013.01);

(Continued)

(58) Field of Classification Search

None

See application file for complete search history.

(56) References Cited

U.S. PATENT DOCUMENTS 10,218,941 B1 2/2019 Park et al.
11,663,514 B1 * 5/2023 Maher ...................... G06N 7/01 706/12

(Continued)

FOREIGN PATENT DOCUMENTS

CN 107031655 A 8/2017
EP 3502963 6/2019

(Continued)

OTHER PUBLICATIONS

Office Action in Chinese Appln. No. 202080084045.5, mailed on Mar. 1, 2025, 15 pages.

(Continued)

*Primary Examiner* — Davin Seol

(74) *Attorney, Agent, or Firm* — Fish & Richardson P.C.

(57) ABSTRACT

Methods, systems, and apparatus, including computer programs encoded on computer storage media, for selecting actions for an agent at a specific real-world location using historical data generated at the same real-world location. One of the methods includes determining a current geolocation of an agent within an environment; obtaining historical data for geolocations in a vicinity of the current geolocation of the agent from a database that maintains historical data for a plurality of geolocations within the environment, the historical data for each geolocation comprising observations generated at least in part from sensor readings of the geolocation captured by vehicles navigating through the environment; generating an embedding of the obtained historical data; and providing the embedding as an input to a policy decision-making system that selects actions to be performed by the agent.

17 Claims, 10 Drawing Sheets

Related U.S. Application Data

(60) Provisional application No. 62/911,183, filed on Oct. 4, 2019.

(51) Int. Cl.
*G05D 1/00* (2006.01)
*G06N 3/08* (2023.01)

(52) U.S. Cl.
CPC ............ *G05D 1/0221* (2013.01); *G06N 3/08* (2013.01); *B60W 2554/4044* (2020.02); *B60W 2556/10* (2020.02)

(56) References Cited

U.S. PATENT DOCUMENTS

2018/0074200 A1 3/2018 Liu et al.
2018/0203461 A1 7/2018 Yokokawa
2018/0297592 A1 10/2018 Kim et al.
2019/0049950 A1 2/2019 Poornachandran et al.
2019/0111923 A1 4/2019 Arquero et al.
2019/0113917 A1 4/2019 Buch et al.
2019/0129436 A1 5/2019 Xing et al.
2019/0156150 A1 5/2019 Krishnan
2019/0266516 A1 8/2019 Olabiyi
2019/0316913 A1* 10/2019 Golov .................... G01C 21/30
2020/0050973 A1 2/2020 Stenneth
2020/0134494 A1* 4/2020 Venkatadri ............. G06N 3/045
2020/0249674 A1* 8/2020 Dally .................. G05D 1/0221
2020/0372012 A1 11/2020 Averbuch et al.
2021/0070286 A1 3/2021 Green et al.
2021/0094558 A1 4/2021 Garcia et al.

FOREIGN PATENT DOCUMENTS

JP 6257872 1/2018
WO WO 2019/023628 1/2019
WO WO 2019/053695 3/2019

OTHER PUBLICATIONS

Extended Search Report in European Appln. No. 20917890.4, dated Aug. 4, 2023, 7 pages.
International Preliminary Report on Patentability in International Appln. PCT/US2020/054278, dated Apr. 5, 2022, 8 pages.
International Search Report and Written Opinion in International Appln. PCT/US2020/054278, dated Oct. 13, 2021, 12 pages.
Office Action in Japanese Appln. No. 2022-519837, dated Apr. 4, 2023, 11 pages (with English translation).

* cited by examiner 124
100
DATABASE SYSTEM 120
LOG DATA
136
LOG DATA
DATABASE
130
GEOLOCATION-
SPECIFIC
SNAPSHOT
DATABASE
132
SENSOR DATA
118
QUERY
154
HISTORICAL DATA
144
SENSOR SYSTEM
104
GEOLOCATION
SYSTEM
106
GEOLOCATION
DATA
108
POLICY DECISION-
MAKING SYSTEM
112
ON-BOARD SYSTEM 110
102

500
524
DATABASE SYSTEM 520
LOG DATA
536
LOG DATA DATABASE 530
GEOLOCATION-SPECIFIC TRAJECTORY DATABASE 534
QUERY 554
HISTORICAL TRAJECTORIES 544
SIMULATED SENSOR SYSTEM 504
SIMULATED GEOLOCATION SYSTEM 506
GEOLOCATION DATA 508
SIMULATED POLICY DECISION-MAKING SYSTEM 512
SIMULATED AGENT SYSTEM 502

SPATIO-TEMPORAL POSE/OBJECT DATABASE

CROSS-REFERENCE TO RELATED APPLICATIONS

This application is a continuation of U.S. application Ser. No. 17/063,330, filed on Oct. 5, 2020, which claims priority to U.S. Provisional Application No. 62/911,183, filed on Oct. 4, 2019. The disclosures of the prior applications are considered part of and are incorporated by reference in the disclosure of this application.

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have on-board computer systems that implement neural networks, other types of machine learning models, or both for various tasks, e.g., policy decision-making. For example, a neural network can be used to select a next action of the autonomous vehicle using input sensor data. Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the neural network thus involves continually performing a forward pass on the input, computing gradient values, and updating the current values for the set of parameters for each layer using the computed gradient values. Once a neural network is trained, the final set of parameter values can be used to make predictions in a production system.

SUMMARY

This specification describes how an agent, e.g., an autonomous or semi-autonomous vehicle, can make policy decisions when the agent is in a particular geolocation in the world by using historical sensor data captured by one or more vehicles as the vehicles navigated through the same particular geolocation in the world at respective precious time steps. Once the agent has been trained, the system can be deployed on a vehicle and can be used by the vehicle to make autonomous or semi-autonomous driving decisions.

The specification also describes how a simulated agent, e.g., a simulated version of a vehicle, can use historical sensor data related to a particular real-world geolocation when making policy decisions inside a simulation of the same particular real-world geolocation.

The specification also describes how a system can curate historical sensor data generated by vehicles navigating through the real-world to associate each piece of historical data with the respective real-world location in which the data was generated. The system can maintain the historical data on the cloud where it can be queried by one or more vehicles.

Particular embodiments of the subject matter described in this specification can be implemented so as to realize one or more of the following advantages.

By using historical data associated with particular real-world locations, an agent can make more accurate policy decisions by leveraging previous experiences of other agents that have been in the same particular real-world location. The agent can leverage information specific to the particular location that may not apply to other locations. For example, the behavior of pedestrians at a given four-way intersection may be very different from the behavior of pedestrians in other locations, or even at other four-way intersections. Thus, using historical data associated with the particular location of an agent can be more useful in selecting actions for the agent than using a larger corpus of historical data generated across many different locations, because the data generated at different locations may be useless or even misleading.

By using the historical data to make policy decisions for simulated agents, a system can improve simulations by making the simulated agents more realistic. The system can also augment existing scenarios to create simulations that are more diverse and complicated than are regularly observed. This, in turn, can lead to improved simulations that can be used to test or otherwise improve the performance of control software for a real-world autonomous or semi-autonomous vehicles.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an agent, e.g., an autonomous or semi-autonomous vehicle or a simulated vehicle, can make policy decisions when the agent is in a particular geolocation by using historical sensor data captured by one or more vehicles as the vehicles navigated through the same particular geolocation.

Figure 1:
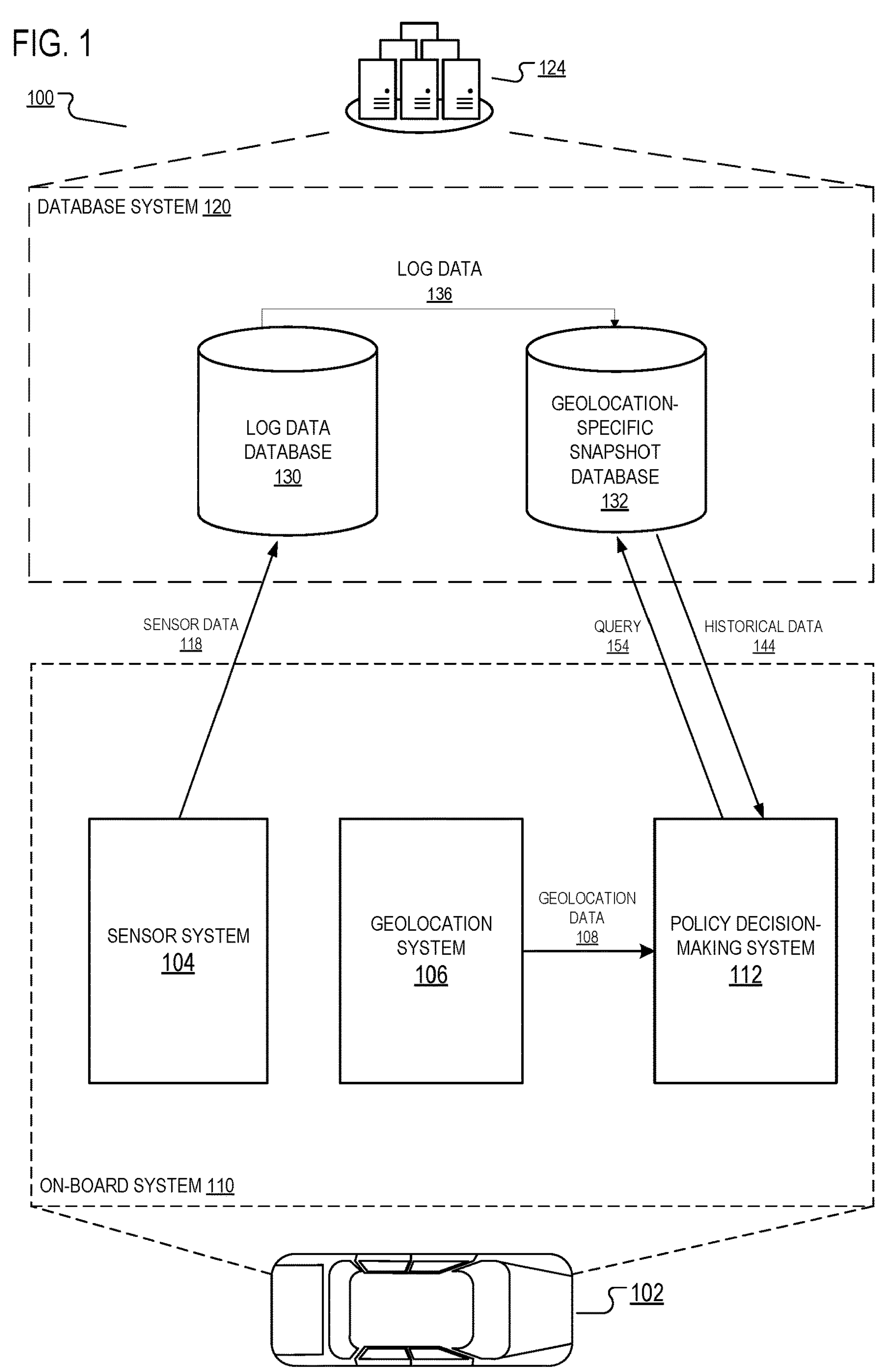
FIG. 1 is a diagram of an example system.

FIG. 1 is a diagram of an example system 100. The system 100 includes an on-board system 110 and a database system 120.

The on-board system 110 is located on-board a vehicle 102. The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with another vehicle.

The on-board system 110 includes one or more sensor systems 104. The sensor systems 104 include a combination of components that receive reflections of electromagnetic radiation, e.g., lidar systems that detect reflections of laser light, radar systems that detect reflections of radio waves, and camera systems that detect reflections of visible light.

The sensor systems 104 or other components of the vehicle 102 can classify groups of one or more raw sensor measurements from one or more sensors as being measures of some object, e.g., another vehicle or a pedestrian. A group of sensor measurements can be represented in any of a variety of ways, depending on the kinds of sensor measurements that are being captured. Each group of raw laser sensor measurements, for example, can be represented as a bounding box with associated kinematic information, where the bounding box is a convex region in the environment that contains the object. The associated kinematic information can include one or more of the velocity of the object, the acceleration of the object, the heading of the object, or the object type of the object. In this specification, these bounding boxes and associated kinematic information are referred to as “perception” data.

Each piece of perception data is associated with a real-world geolocation, the real-world geolocation being the location occupied by the object represented by the perception data at the time the perception data was recorded. Each real-world geolocation is a specific point in the world (for example, the intersection of Broadway and Wall Street in Manhattan), as opposed to a generalized type of location (for example, an intersection). For example, the real-world geolocation can be a particular cell in a decomposition of the Earth into multiple cells, e.g., a cell at a particular level of the s2cell hierarchy.

The sensor systems 104 or other components of the vehicle 102 can also generate data logging the fact that the vehicle 102 visited a real-world geolocation, independent of any associated perception data. In this specification, the data logging the one or more real-world geolocations that the vehicle 102 visits is referred to as “pose” data. As the vehicle 102 navigates through the real world, the vehicle 102 continuously generates sensor data 118, including both perception and pose data, and provides the sensor data 118 to the database system 120. In some implementations, the vehicle 102 provides the sensor data 118 in the form of “logs.” A log is a single piece of either perception or pose data.

An example perception log might be a bounding box enclosing the space where a pedestrian was detected crossing Broadway Street, with associated kinematic information detailing that the pedestrian was walking at a speed of 3 miles per hour. An example pose log might be an identification that the vehicle 102 was at the corner of Broadway and Wall Street.

The database system 120 stores received log data in a log data database 130, which stores logs of sensor data received from vehicles in a fleet of one or more vehicles that are in communication with the database system 120.

The database system 120 can group the log data per specific geolocation in the real world, so that log data collected in the same geolocation by different vehicles at different times is in the same geolocation-specific grouping. To do so, the database system 120 processes the log data stored in the log data database 130, assigning each log in the log data database 130 to the geolocation that the object represented by the log was in when the log was generated. The database system 120 stores this mapping of geolocation-to-log data in a geolocation-specific snapshot database 132. The geolocation-specific snapshot database 132 can be queried for a given geolocation. In response to a query, the geolocation-specific snapshot database 132 can provide perception and/or pose log data generated in the given geolocation. The geolocation-specific snapshot database 132 can be a system of multiple databases, or it can be one or more sections of a larger database.

The on-board system 110 also includes a policy decision-making system 112 that selects actions for the vehicle 102 and a geolocation system 106.

The geolocation system 106 repeatedly determines the current geolocation of the vehicle 102, generating geolocation data 108 that includes the current geolocation of the vehicle 102. The geolocation system 106 sends the geolocation data 108 to the policy decision-making system 112.

The policy decision-making system 112 uses the geolocation data 108 to generate a query 154 and transmits the query 154 to the geolocation-specific snapshot database 132. The query 154 includes the current geolocation of the vehicle 102, and requests data for the current geolocation and optionally one or more surrounding geolocations.

The geolocation-specific snapshot database 132 collects historical data 144 from the data that it stores. The historical data 144 includes perception and/or pose log data that corresponds to the current geolocation and optionally one or more geolocations surrounding the current geolocation, according to the query 154. The geolocation-specific snapshot database 132 sends the historical data 144 to the policy decision-making system 112.

In some implementations, the policy decision-making system 112 generates an embedding of the historical data 144, transforming the data into a more usable form. An embedding is an ordered collection of numeric values, e.g., a vector or matrix of floating point or other numeric values, that represents an input. The policy decision-making system 112 processes the embedding of the historical data 144 to make policy decisions.

In some implementations, the query 154 can also include one or more conditions that the historical data 144 must meet to be returned. For instance, if the vehicle 102 is navigating while it is raining, the policy decision-making system 112 might include in the query 154 the condition that the returned historical data 144 must only include data that was gathered when it was raining. Other non-limiting examples of potential conditions of interest can include time of day, day of the week, time of year, traffic conditions, and other weather conditions. In these implementations, the geolocation-specific snapshot database only returns data that meets all the required conditions.

In some implementations, in order to process the log data in the log data database 130 to generate the data stored in the geolocation-specific snapshot database 132, the database system 120 uses a pre-established voxel grid imposed on the real world in order to group the log data per specific geolocation. That is, the database system 120 determines, for each geolocation corresponding to a perception or pose log, which voxel in an established voxel grid contains the log, and assigns the log to the determined voxel. Each voxel is a three-dimensional convex shape, e.g., a box, that characterizes a corresponding three-dimensional space in the real world. The voxel grid is a grid of such voxels for a certain region of the real world, where every given geolocation in that region of the real world is included in exactly one voxel. In these implementations, the geolocation-specific snapshot database 132 groups logs per voxel, so that when the database receives a query for a given geolocation, the database determines which voxel contains the given geolocation, and then the database returns data corresponding to that voxel. In these implementations, when the policy decision-making system 112 requests data for the current geolocation of the vehicle 102 and optionally surrounding geolocations, the database can return data for the voxel that contains the vehicle 102, and optionally the surrounding voxels.

The process by which a policy decision-making system can embed historical data and use the embedding to make policy decisions is described in more detail below in reference to FIG. 3 and FIG. 4.

It is not required for the vehicle 102 to be a physical vehicle, and therefore not required for the on-board system 110 to be physically on-board the vehicle 102. The above description of FIG. 1 is equally applicable to a simulated agent operating in an environment simulating a real-world location. In this implementation, the on-board system 110 can be located in the cloud, the sensor system 104 can be a simulated sensor system, the geolocation system 106 can be a simulated geolocation system, and the policy decision-making system can decide the policy for the simulated agent operating in the simulated environment. The simulated environment can be a simulation of a real-world location for which the database system 120 has historical data. The simulated geolocation system 106 can provide geolocation data 108 that corresponds to a real-world geolocation, so that the policy decision-making system 112 can submit queries 154 for historical data 144 that correspond to a real-world geolocations and make decisions as if the simulated agent were operating in that real-world geolocation.

Such a simulated implementation might be useful to train machine learning models that will eventually be deployed on vehicles in the real-world. Such a simulated implementation might also be useful to test software before it is deployed on vehicles in the real world, to make sure the software functions as desired.

Figure 2:
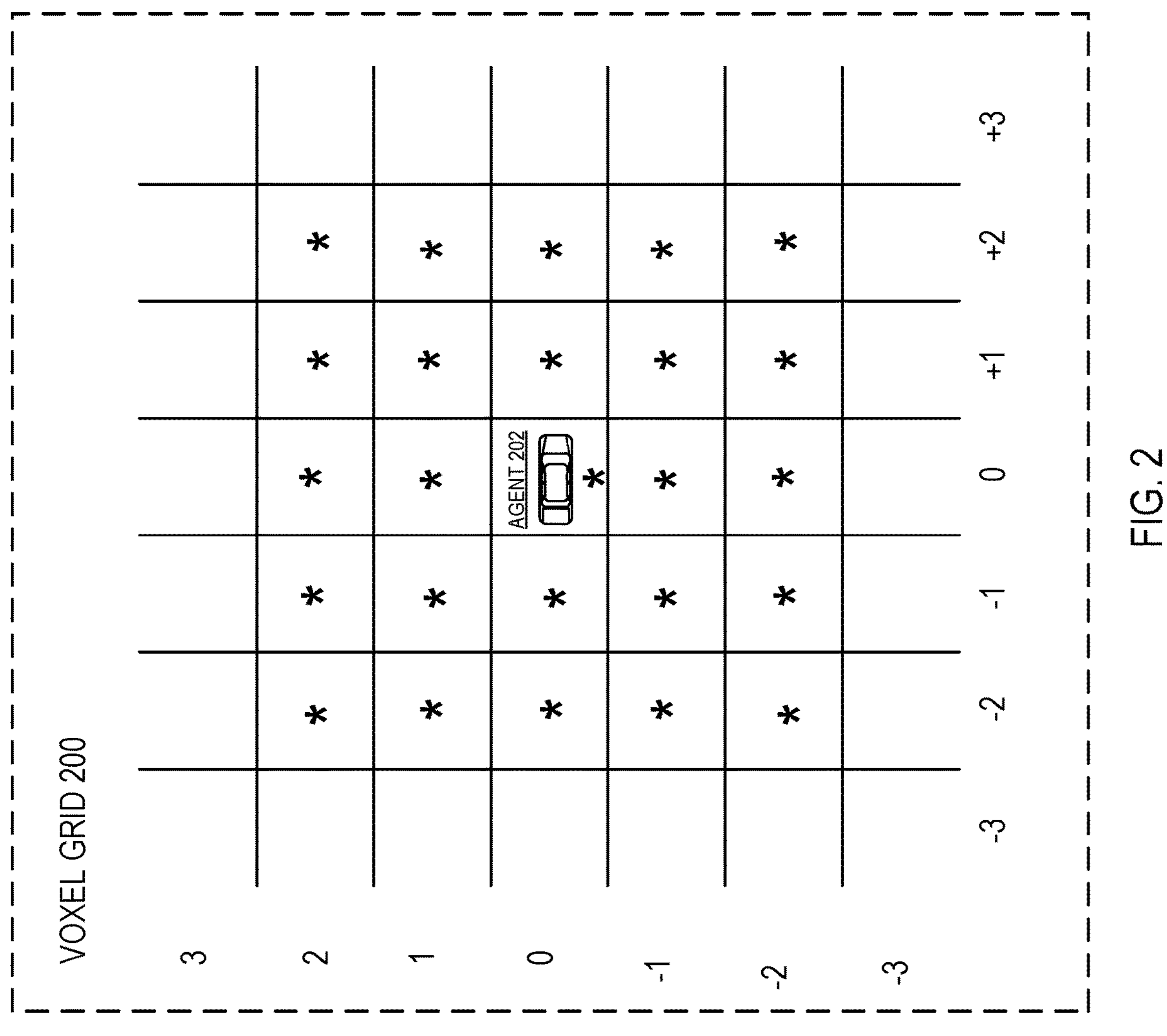
FIG. 2 is a diagram of an example voxel grid.

FIG. 2 is a diagram of an example voxel grid 200.

An agent 202 is in the center voxel (0, 0) of the grid. A policy decision-making system of the agent 202 receives the current geolocation (0, 0) of the agent 202 from a geolocation system of the agent 202, and queries a geolocation-specific snapshot database for historical data generated in the current geolocation and, optionally, one or more surrounding geolocations of interest. In the example illustrated in FIG. 2, the voxels that contain geolocations of interest are marked with a star, and surround the car from the −2 coordinate to the +2 coordinate in both coordinate directions. The policy decision-making system of the agent 202 does not submit queries for historical data for any other voxels except those designated as voxels of interest, denoted by the stars. For instance, the voxel (−3, −3) is not included in the query to the geolocation-specific snapshot database.

When the policy decision-making system receives the desired historical data back from the geolocation-specific snapshot database, the policy decision-making system uses the data to select an action for the agent 202. This process is described in more detail below in reference to FIG. 3 and FIG. 4.

Figure 3:
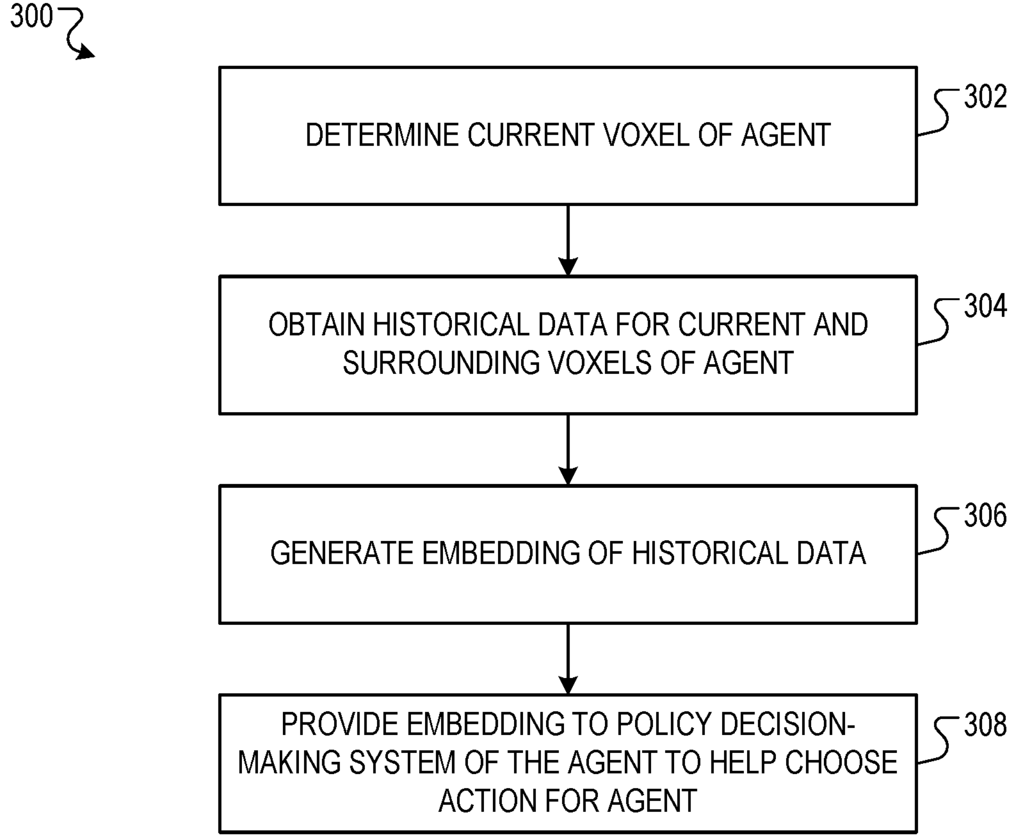
FIG. 3 is a flow chart of an example process for using historical data for selecting an action of an agent.

FIG. 3 is a flow diagram of an example process 300 for using a geolocation-specific snapshot database to select an action for an agent. For convenience, the process 300 will be described as being performed by a system of one or more computers located in one or more locations. For example, an on-board system, e.g., the on-board system 110 of FIG. 1, appropriately programmed in accordance with this specification, can perform the process 300.

The system determines the current geolocation of the agent (step 302). In some implementations, determining the current geolocation of the agent includes determining the current voxel of the agent in a predetermined voxel grid imposed on the environment of the agent.

The system obtains historical data for the current voxel and, optionally, surrounding voxels of the agent (304). For example, the system can submit a query to the geolocation-specific snapshot database. The query can identify the voxels of interest. The system can then receive back from the geolocation-specific snapshot database the queried data. In some implementations, the system includes in the query the current voxel of the agent and a predetermined number of surrounding voxels, the surrounding voxels being in a predetermined formation surrounding the current voxel of the agent. For example, the system can include nine voxels that form a three-by-three subgrid of the voxel grid, where the current voxel of the agent is the center voxel of the three-by-three subgrid.

The system generates an embedding of the historical data (step 306).

In some implementations, the system generates the embedding of the historical data by computing statistics directly on the historical data. For instance, the system can compute the percentage of time a surrounding vehicle is observed in a given voxel, in proportion to the number of times an agent has obtained sensor data from that voxel. The system can further compute statistics on the distribution of velocities, headings, or any other information associated with perception data. The system can compute individual sets of these statistics for each individual voxel, a combined set of these statistics for all historical data across multiple voxels, or can compute both individual sets of statistics and a combined set of statistics. The system can then generate a single embedding of the historical data from the computed statistics. For example, if the system uses a machine-learned neural network planner to select actions for the agent, the system can include each of the computed statistics for each voxel as elements of a vector, and provide the vector to the neural network.

In some other implementations, the system generates the embedding of the historical data by processing the data using one or more embedding neural networks. This process is described in more detail below in reference to FIG. 4.

The system processes the generated embedding to select an action for the agent (step 308).

In some implementations, the system uses a machine-learned neural network planner to select actions for the agent. In these implementations, the system can provide the embedding as an input to the neural network.

In some other implementations, the system uses the embedding of the historical data to select a policy by providing the embedding as an input to a discriminator which evaluates candidate actions. The discriminator can evaluate a proposed action to be taken by the agent, a proposed next state of the agent, or both, either accepting or rejecting the proposed action and/or next state. If the discriminator is a machine-learned neural network discriminator, the discriminator can take as input the proposed action and/or next state in vector form and the embedding of the historical data in vector form, optionally among other inputs. In some implementations, the discriminator outputs a score, the score characterizing a likelihood that the proposed action and/or next state is realistic or desirable given the current state and historical data. In some other implementations, the discriminator outputs a binary decision either to accept or reject the proposed action and/or next state, for example accepting the proposed action and/or next state if the score meets a predetermined threshold and rejecting the proposed action and/or next state otherwise.

Figure 4:
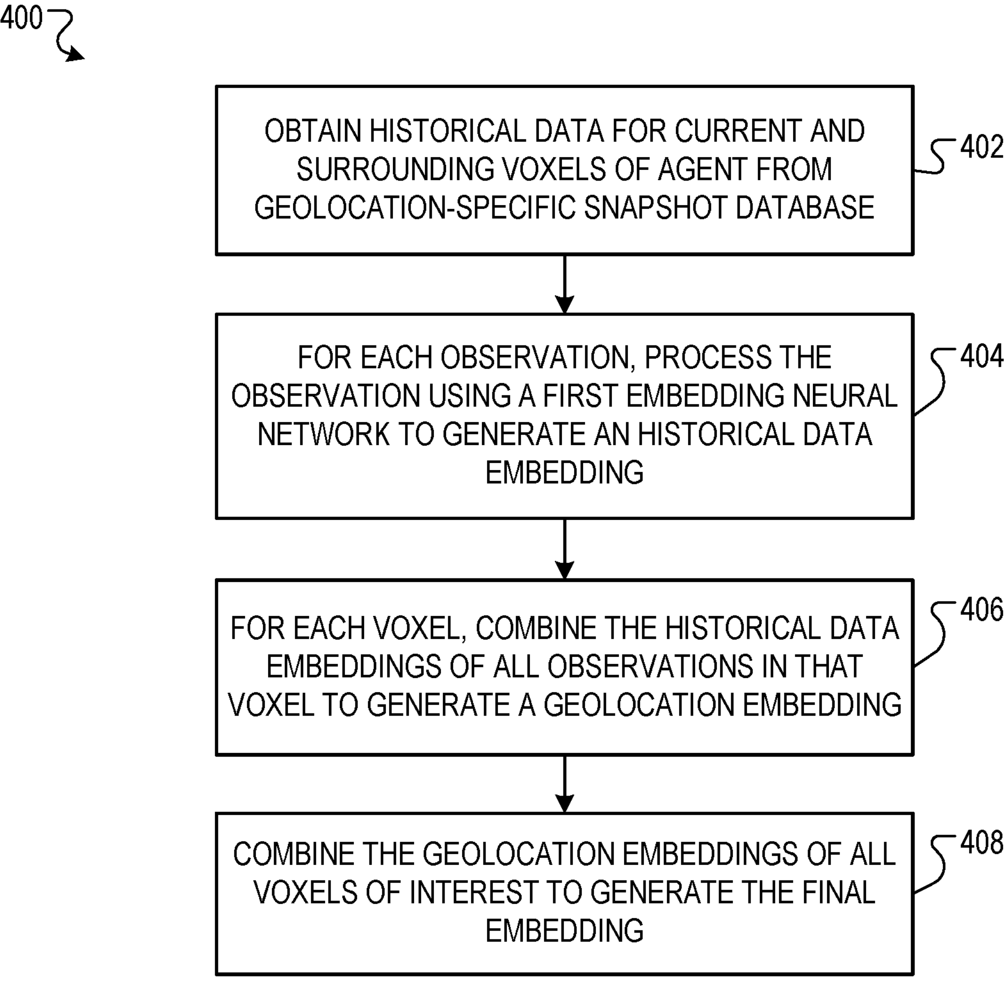
FIG. 4 is a flow chart of an example process for generating an embedding of historical data.

FIG. 4 is a flow diagram of an example process 400 for generating an embedding of queried historical data. For convenience, the process 400 will be described as being performed by a system of one or more computers located in one or more locations. For example, a policy decision-making system, e.g., the policy decision-making system 112 of FIG. 1, appropriately programmed in accordance with this specification, can perform the process 400.

The system obtains historical data for current and surrounding voxels of an agent in an environment (step 402). The system can receive one or more logs of historical data from a database, e.g., the geolocation-specific snapshot database 132 depicted in FIG. 1. Each log of historical data can correspond to a respective voxel of the queried voxels.

The system processes the data using a first embedding neural network to generate an historical data embedding for each log in the historical data (step 404).

For example, the system can generate an initial embedding for each log of historical data. As a particular example, a log of historical data can include i) data defining a three-dimensional bounding box of an object in the environment, and ii) one or more motion parameters (e.g., one or more of velocity, acceleration, heading, location, etc.) of the object in the environment. In this example, the system can generate an initial embedding that includes elements identifying the parameters of the bounding box and elements identifying the motion parameters.

The system can then process the initial embedding of the log of historical data using a neural network to generate the historical data embedding for the log. For example, the system can process the initial embedding using a multi-layer perceptron.

In some implementations, before processing a log to generate the historical data embedding for the log, the system subtracts the center position of the voxel from the location in the environment with which the log is associated. That is, the system represents the log using a coordinate system whose origin is the center of the voxel. Thus, each log across all queried voxels can be normalized with respect to the location of the voxel of the log. Doing so can help the system maintain numerical precision, and can ensure that the respective historical data embedding of each log is uniform across the voxel grid.

In some implementations, multiple different logs corresponding to respective different time points can be associated with each other. For example, the logs can represent the same object at the respective different time points. In some such implementations, the system can further process the respective historical embeddings of the associated logs to generate a single combined historical embedding for the multiple logs. For example, the system can process the respective historical embeddings of the associated logs using a neural network that includes one or more one-dimensional convolutional neural network layers, where each convolutional neural network layer convolves a filter across the historical embeddings in the time dimension.

The system combines, for each queried voxel, each historical data embedding corresponding to the voxel to generate a respective geolocation embedding (step 406). That is, the system generates one geolocation embedding per queried voxel. For example, for each queried voxel, the system can combine the historical data embeddings using a second embedding neural network. In some implementations, the second embedding neural network includes one or more convolutional neural network layers followed by one or more fully-connected layers, which produce a fixed-length vector.

The system combines the geolocation embeddings for all queried voxels to generate the final embedding (step 408). For example, the system can concatenate the geolocation embeddings to generate the final embedding. As another example, the system can determine the final embedding to be the average of the geolocation embeddings. As another example, the system can process the geolocation embeddings using a max-pooling or a min-pooling layer. As another example, the geolocation embeddings are combined using a third embedding neural network.

If the system uses a machine-learned neural network planner, the system can provide this final embedding to a policy neural network to select an action for the agent. In some implementations, the one or more embedding neural networks are trained concurrently with the policy neural network. For example, a training system can backpropagate an error of the policy neural network through the policy neural network to the one or more embedding neural networks. By training the embedding neural networks jointly with the policy neural network, the system can ensure that the embeddings generated by the embedding neural networks represent properties of the input historical data that are useful to the policy neural network in selecting actions for the agent.

Figure 5:
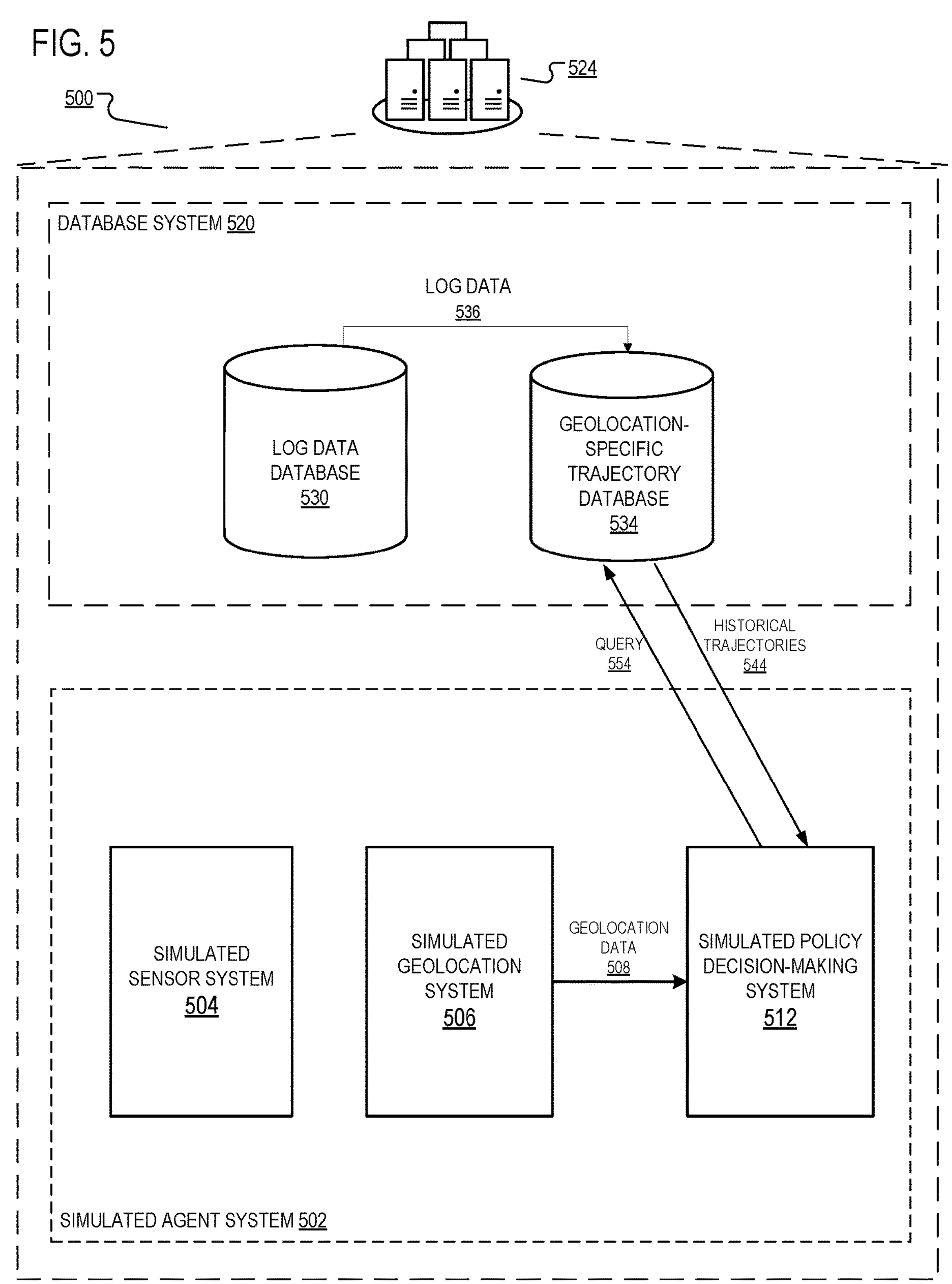
FIG. 5 is a diagram of another example system.

FIG. 5 is a diagram of an example system 500. The system 500 is an example of a system that is implemented as one or more computer programs on one or more servers 524. The system 500 includes a simulated agent system 502 and a database system 520.

The simulated agent system 502 is located on the cloud, and is a simulated version of an on-board system located on-board a vehicle.

The simulated agent system 502 includes a simulated sensor system 504. The simulated sensor system 504 simulates a sensor system that would be found on-board a vehicle. The simulated sensor system 504 receives data characterizing sensor measurements that would have been generated by sensors and components of the on-board sensor system. The simulated sensor system 504 or other components of the simulated agents system 502 can classify data characterizing groups of one or more sensor measurements from one or more sensors as being measures of some object, e.g., another vehicle or a pedestrian.

As described above in reference to FIG. 1, the database system 520 includes a log data database 530, which stores log data 536 that characterizes logs of sensor data received from vehicles in a fleet of one or more vehicles that are in communication with the database system 520. The log data 536 includes both perception and pose data.

The database system 520 can group the log data 536 per particular geolocation in the real world and per particular object observed. For example, for a given object observed by a vehicle in the real world, the database system 520 can group a sequence of perception logs of the given object that were generated by the vehicle, e.g., a sequence of a predetermined number of perception logs. In this specification, a sequence of a predetermined number of perception logs representing a single object is referred to as a "trajectory" of the object. The database system 120 stores these trajectories in a geolocation-specific trajectory database 534. The geolocation-specific trajectory database 534 can be queried for a given geolocation and provide all trajectories that include the given geolocation.

For example, if a vehicle generates sensor data logging that a given object was in geolocations A, B, C, and D, at respective time points in that order, and the database system 520 generates trajectories in groups of three perception logs, then the database system 520 would generate a first trajectory (A, B, C) and a second trajectory (B, C, D), and store these two trajectories in the geolocation-specific trajectory database 534. The geolocation-specific trajectory database 534 can then be queried for geolocation B, and the geolocation-specific trajectory database 534 would return both of the above trajectories because geolocation B is in both trajectories. The geolocation-specific trajectory database 534 can be a system of multiple databases, or it can be one or more sections of a larger database.

The simulated agent system 502 also includes a simulated geolocation system 506 and a simulated policy decision-making system 512 that selects actions for the agent being simulated.

During a simulation in which the simulated agent system 502 is simulating an on-board system located on-board a vehicle navigating in the real world, the simulated geolocation system 506 repeatedly generates the current simulated geolocation of the simulated agent as the simulated agent navigates through the simulated environment, generating geolocation data 508. The simulated geolocation system 506 sends the geolocation data 508 to the simulated policy decision-making system 512.

The simulated policy decision-making system 512 uses the geolocation data 508 to generate a query 554 and transmits the query 554 to the geolocation-specific trajectory database 534. The query 554 identifies the current simulated geolocation of the simulated agent, and requests data for the current simulated geolocation and optionally one or more surrounding geolocations.

The geolocation-specific trajectory database 534 collects historical trajectories 544 from the data that it stores. The historical trajectories 544 can include trajectories that include the current simulated geolocation. In some implementations, the historical trajectories 544 exclude those trajectories for which the final geolocation in the trajectory is the current simulated geolocation, as those trajectories have no value in determining a next geolocation after the current simulated geolocation. The geolocation-specific trajectory database 534 sends the historical trajectories 544 to the simulated policy decision-making system 512. The simulated policy decision-making system 512 uses the historical trajectories 544 to make policy decisions.

In some implementations, the query 544 can further identify one or more previous simulated geolocations of the simulated agent. In these implementations, the returned historical trajectories 544 can only include trajectories that include all previous simulated geolocations of the simulated agent and the current simulated geolocation of the simulated agent, with the geolocations being in the same order in the historical trajectories 544 as the order in which the simulated agent simulated visiting the geolocations. This process is described in more detail below in reference to FIG. 7.

As described above in reference to FIG. 1, in some implementations, the query 554 can also identify one or more conditions that the historical trajectories 544 must meet to be returned. For instance, if the simulated environment is simulating rainy conditions, the simulated policy decision-making system can include in the query 554 the condition that the returned historical trajectories 544 must only include data that was gathered when it was raining.

As described above in reference to FIG. 1, in some implementations, the database system 520 uses a pre-established voxel grid imposed on the real world in order to group the log data per specific geolocation when generating the data to be stored in the geolocation-specific trajectory database 534.

The process by which a simulated policy decision-making system can use historical trajectories to make policy decisions is described in more detail below in reference to FIGS. 8-10.

Figure 6:
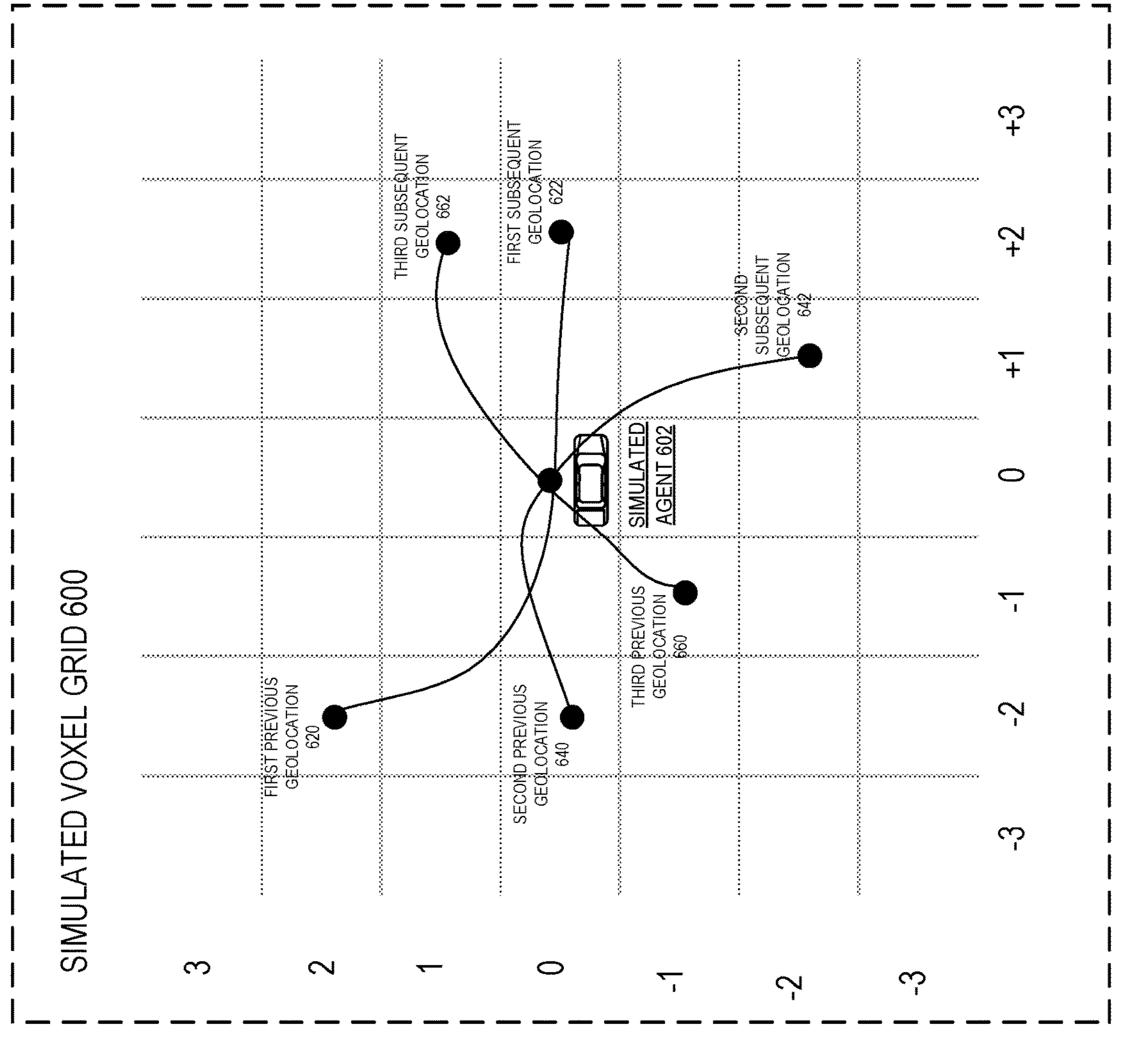
FIG. 6 is a diagram of an example simulated voxel grid.

FIG. 6 is a diagram of an example simulated voxel grid 600.

A simulated agent 602 is in the center voxel (0, 0) of the grid. The simulated policy decision-making system of the simulated agent 602 receives the current simulated geolocation (0, 0) of the simulated agent 602 from a simulated geolocation system of the simulated agent 602, and queries a geolocation-specific trajectory database for historical trajectories that include the current simulated geolocation (0, 0).

In the example illustrated in FIG. 6, the simulated policy decision-making system receives back three trajectories. The first trajectory includes a first previous geolocation 620, the current simulated geolocation, and a first subsequent geolocation 622. The second trajectory includes a second previous geolocation 640, the current simulated geolocation, and a second subsequent geolocation 642. The third trajectory includes a third previous geolocation 660, the current simulated geolocation, and a third subsequent geolocation 662. Each of the three trajectories was generated by a respective vehicle that visited the real-world geolocations corresponding to i) the respective previous geolocation, ii)

the current simulated geolocation, and iii) the respective subsequent geolocation, in that order.

When the simulated policy decision-making system of the simulated agent 602 receives data characterizing the three trajectories from the geolocation-specific trajectory database, the simulated policy decision-making system can use the trajectories to select an action for the simulated agent 602. This process is described in more detail below in reference to FIGS. 8-10.

Figure 7:
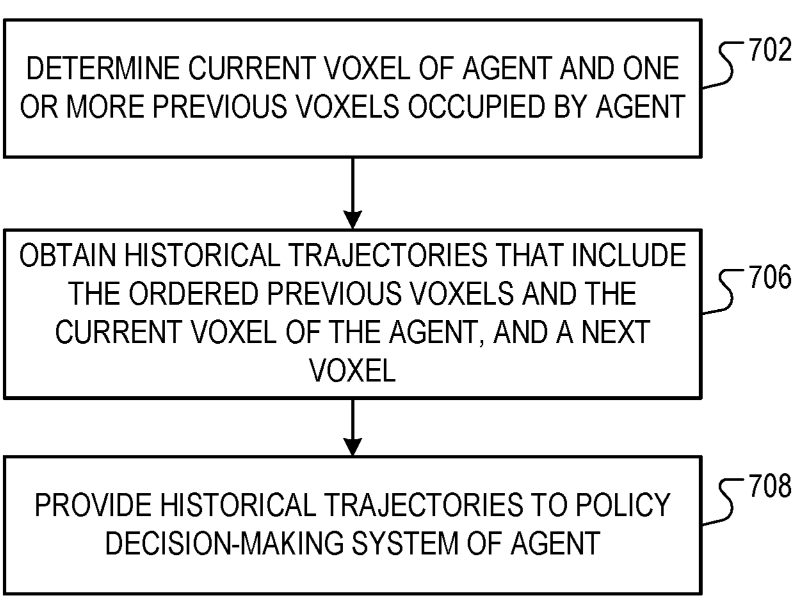
FIG. 7 is a flow chart of an example process for querying historical data.

FIG. 7 is a flow diagram of an example process 700 for querying trajectories using a current simulated geolocation of a simulated agent and one or more previous simulated geolocations of the simulated agent. For convenience, the process 700 will be described as being performed by a system of one or more computers located in one or more locations. For example, a simulated agent system, e.g., the simulated agent system 502 of FIG. 5, appropriately programmed in accordance with this specification can perform the process 700.

The system determines a current voxel of the simulated agent and one or more previous voxels occupied by the simulated agent (step 702). The current voxel characterizes the current simulated geolocation of the simulated agent. The previous voxels characterize respective previous simulated geolocations of the simulated agent. The system can also determine an order in which the simulated agent occupied the previous voxels.

The system obtains historical trajectories that include the previous voxels of the simulated agent, in the same order, followed by the current voxel of the simulated agent and a next voxel (step 706). The next voxel of each trajectory is a voxel in the trajectory that comes after the current voxel of the simulated agent in the trajectory. The next voxels represent geolocations visited by the respective vehicle that generated the data characterizing the trajectory after the vehicle visited the current voxel of the simulated agent.

The system provides the historical trajectories to a simulated policy decision-making system of the simulated agent (step 708). The simulated policy decision-making system uses the trajectories to select a next action for the simulated agent. Example processes for selecting a next action are described in more detail in reference to FIGS. 8-10.

Figure 8:
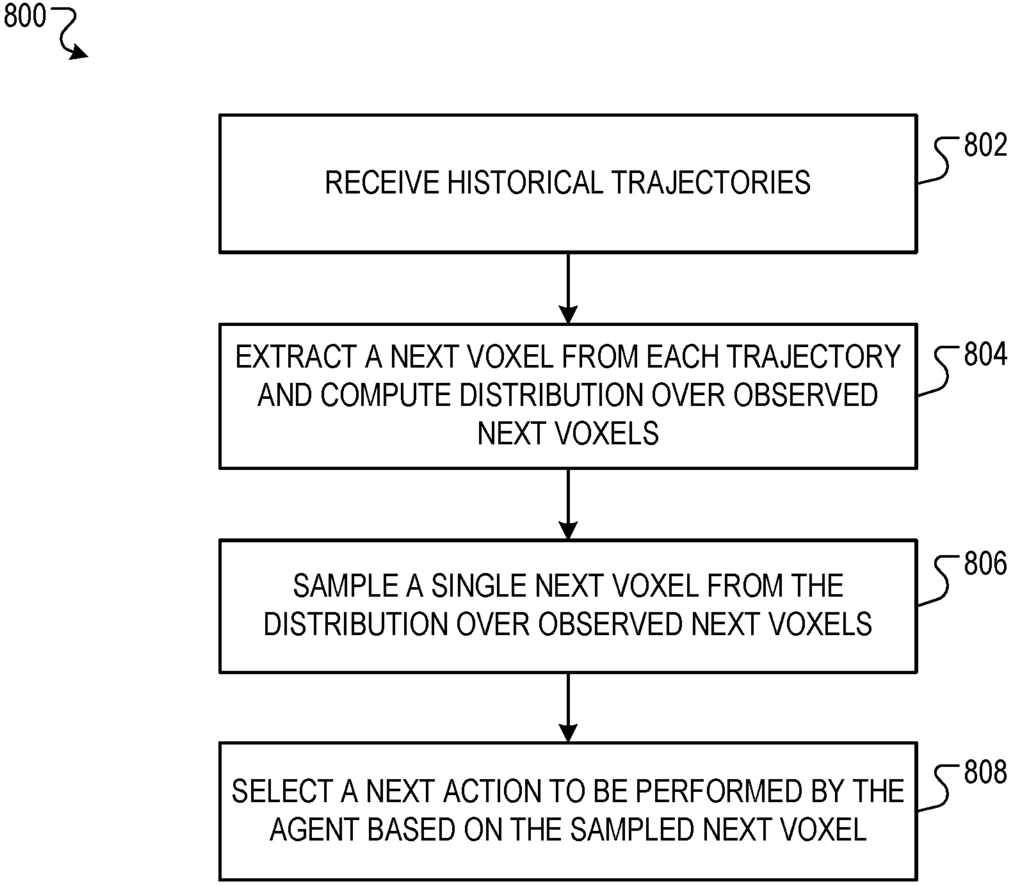
FIG. 8 is a flow chart of an example process for using historical data for selecting an action of a simulated agent.

FIG. 8 is a flow diagram of an example process 800 for selecting a next action for a simulated agent. For convenience, the process 800 will be described as being performed by a system of one or more computers located in one or more locations. For example, a simulated policy decision-making system, e.g., the simulated policy decision-making system 512 of FIG. 5, appropriately programmed in accordance with this specification, can perform the process 800.

The system receives historical trajectories from a geolocation-specific trajectory database (step 802). The historical trajectories each include a current voxel of the simulated agent and one or more next voxels.

The system extracts one or more next voxels from each trajectory, and computes a distribution over the observed next voxels (step 804). For example, for each trajectory the system can determine the next voxel immediately following the current voxel of the simulated agent. Then, for each determined next voxel, i.e., for each voxel that is the next voxel in at least one of the trajectories, the system can determine the relative frequency with which the next voxel occurs in the group of determined next voxels. Thus, each next voxel has an associated probability which characterizes the proportion of historical trajectories that include the respective next voxel.

The system samples a single next voxel from the distribution over observed next voxels (step 806).

In some implementations, the system samples a next voxel in proportion to the associated probability of the next voxel.

In some other implementations, the system samples only from next voxels with relatively low associated probabilities. A relatively low associated probability is an associated probability that is below a certain threshold, e.g., 1%, 5%, or 10%. The threshold can be chosen so that common next voxels, e.g., a next voxel with associated probability 40%, are eliminated from being sampled. In this way the system can generate simulations that include simulated agents that behave in ways that are possible, i.e., that have been observed in the real world, but uncommon. Thus, the software that is being trained or tested using the simulation can be exposed to a wide variety of training examples and not only the most common behaviors observed in the real world.

The system selects a next action based on the sampled next voxel (step 808). In some implementations, the system selects an action that will result in the simulated agent moving to the sampled next voxel in a future time step.

Figure 9:
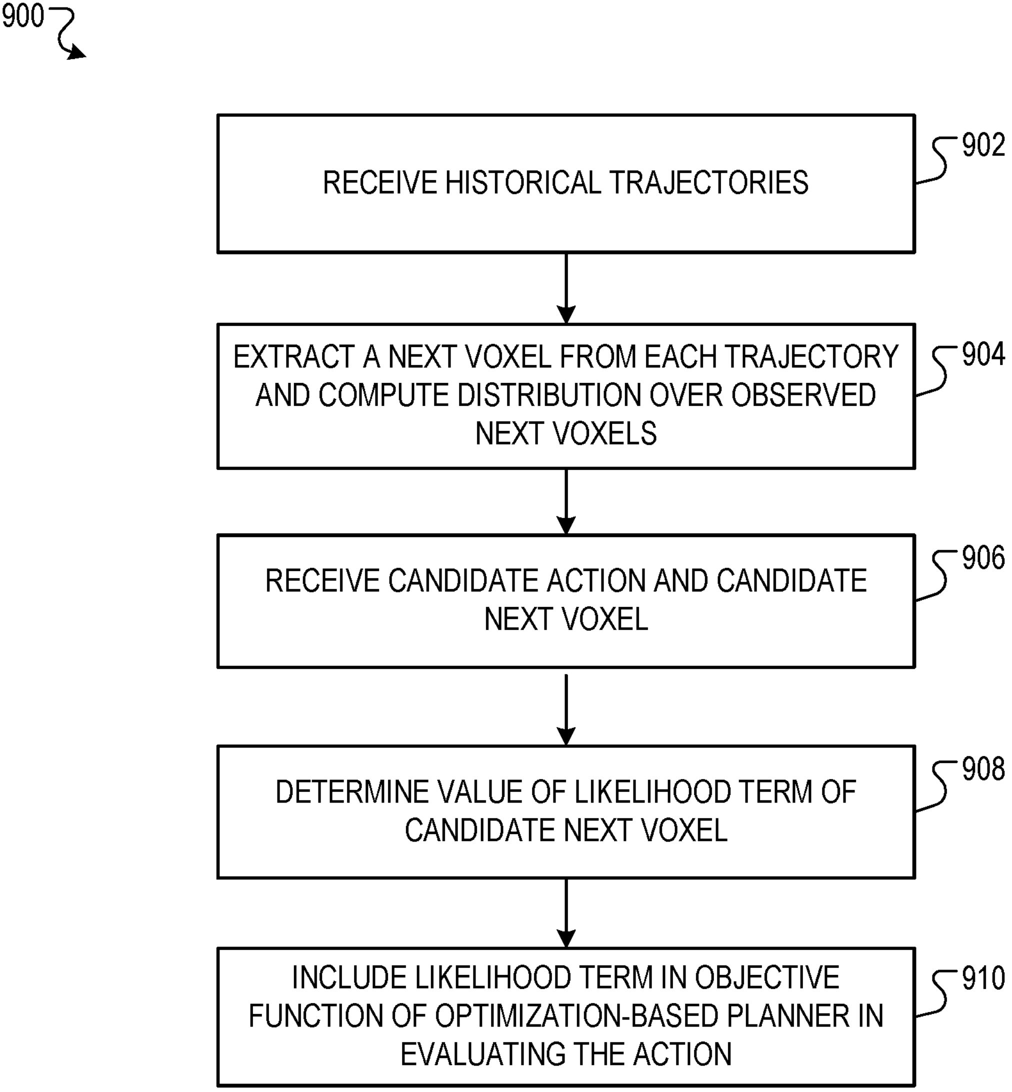
FIG. 9 is a flow chart of an example process for using historical data for evaluating a candidate action of a simulated agent.

FIG. 9 is a flow diagram of an example process 900 that evaluates a candidate action for a simulated agent using an optimization-based planner. For convenience, the process 900 will be described as being performed by a system of one or more computers located in one or more locations. For example, a simulated policy decision-making system, e.g., the simulated policy decision-making system 512 of FIG. 5, appropriately programmed in accordance with this specification, can perform the process 900.

The system receives historical trajectories from a geolocation-specific trajectory database (step 902). The historical trajectories each include a current voxel of the simulated agent and one or more next voxels.

The system extracts one or more next voxels from each trajectory, and computes a distribution over the observed next voxels (step 904). For example, for each extracted next voxel, the system can determine the relative frequency with which the next voxel occurs in the group of extracted next voxels. Thus, for each next voxel the system generates an associated probability that characterizes the proportion of historical trajectories that include the respective next voxel.

The system receives a candidate action and candidate next voxel (step 906). The candidate action can be generated by the optimization-based planner or some other system of the simulated agent, and represents an action that the simulated agent might perform. The candidate next voxel is a voxel that the simulated agent will move to if the simulated agent performs the candidate action.

The system determines a likelihood term for the candidate next voxel (step 908). In some implementations, the likelihood term is equal to or, more generally, proportional to the associated probability of the candidate next voxel in the distribution over observed next voxels.

The system includes the likelihood term in an objective function of the optimization-based planner (step 910). The objective function is a function that is to be maximized by the optimization-based planner. In some implementations, the likelihood term is included in the objective function in such a way that the objective function increases as the likelihood term increases. In such implementations, the objective function thereby rewards actions that result in next voxels that have relatively high associated probabilities in the distribution over observed next voxels. In this way, the optimization-based planner is more likely to select an action that has been observed often in the historical trajectories.

In some implementations, the system performs the process 900 for each of multiple candidate actions, and then selects the candidate action that maximizes the objective function.

Figure 10:
FIG. 10 is a flow chart of an example process for using historical data for discriminating a candidate action of a simulated agent.
Figure 10:
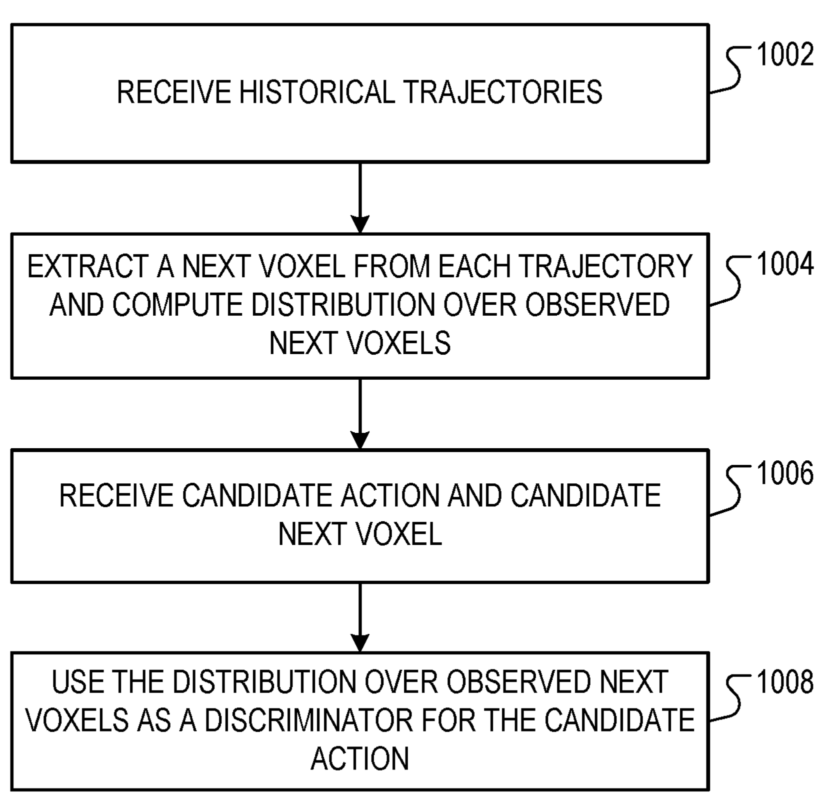

FIG. 10 is a flow diagram of an example process 1000 that discriminates a candidate next action for a simulated agent. For convenience, the process 1000 will be described as being performed by a system of one or more computers located in one or more locations. For example, a simulated policy decision-making system, e.g., the simulated policy decision-making system 512 of FIG. 5, appropriately programmed in accordance with this specification, can perform the process 1000.

The system receives historical trajectories from a geolocation-specific trajectory database (step 1002). The historical trajectories each include a current voxel of the simulated agent and one or more next voxels.

The system extracts one or more next voxels from each trajectory, and computes a distribution over the observed next voxels (step 1004). For example, for each extracted next voxel the system can determine the relative frequency with which the next voxel occurs in the group of extracted next voxels. Thus, each next voxel has an associated probability which characterizes the proportion of historical trajectories that include the respective next voxel.

The system receives a candidate action and respective candidate next voxel (step 1006). The candidate action can be generated by a policy decision-making system of the simulated agent, and represents an action that the simulated agent might perform. The candidate next voxel is a voxel that the simulated agent will move to if the simulated agent performs the candidate action.

The system uses the distribution over observed next voxels as a discriminator for the candidate action and candidate next voxel (1008). In other words, the system uses the distribution over observed next voxels to determine whether the candidate next voxel associated with the candidate action is a realistic next voxel for the agent, and accepts or rejects the candidate action based on that determination. In some implementations, the system rejects candidate actions whose associated candidate next voxels have a relatively low associated probability in the distribution over observed next voxels, for example, if the associated probability is below a predetermined threshold, e.g., 0.1 or 0.05. As a particular example, the system can accept the candidate action if the associated candidate next voxel appears in the group of extracted next voxels, and reject the candidate action if the associated candidate next voxel does not appear in the group of extracted next voxels.

In some implementations, if the system accepts the candidate action then the simulated agent performs the candidate action, and if the system does not accept the candidate action then the policy decision-making system of the agent generates a new candidate action.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

determining a current geolocation of an agent within an environment;

obtaining historical data for geolocations in a vicinity of the current geolocation of the agent from a database that maintains historical data for a plurality of geolocations within the environment, the historical data for each geolocation comprising observations generated at least in part from sensor readings of the geolocation captured by vehicles navigating through the environment;

generating an embedding of the obtained historical data; and providing the embedding as an input to a policy decision-making system that selects actions to be performed by the agent.

Embodiment 2 is the method of embodiment 1, wherein the current geolocation is a specific voxel in a voxel grid imposed on the environment.

Embodiment 3 is the method of embodiment 2, wherein the geolocations in a vicinity of the current geolocation include the specific voxel and a set of surrounding voxels that surround the specific voxel.

Embodiment 4 is the method of any one of embodiments 1-3, wherein the agent is an autonomous vehicle.

Embodiment 5 is the method of any one of embodiments 1-3, wherein the agent is a simulated agent used in a simulated version of the environment.

Embodiment 6 is the method of any one of embodiments 1-5, wherein the policy decision-making system is an optimization-based planner.

Embodiment 7 is the method of any one of embodiments 1-5, wherein the policy decision-making system is a machine-learned neural network planner.

Embodiment 8 is the method of embodiment 7, wherein generating the embedding comprises:

computing statistics from the observations in the obtained historical data; and generating the embedding from the computed statistics.

Embodiment 9 is the method of any one of embodiments 7 or 8, wherein generating the embedding comprises:

processing the obtained historical data using an embedding neural network to generate historical data embeddings, and for each geolocation in the vicinity of the current geolocation, combining each historical data embedding corresponding to the geolocation to generate a geolocation embedding for the geolocation; and combining the geolocation embeddings to generate the embedding.

Embodiment 10 is the method of any one of embodiments 1-9, wherein providing the embedding of the historical data to a policy decision-making system comprises providing the embedding of the historical data as an input to a discriminator of the policy decision-making system.

Embodiment 11 is the method of any one of embodiments 1-10, wherein each observation in the historical data for each geolocation identifies that the geolocation was encountered by a vehicle and whether an object was detected in the geolocation by the sensors of the vehicle.

Embodiment 12 is the method of embodiment 11, wherein when an object was detected in the geolocation by the sensors of the vehicle, the observation identifies one or more properties of the detected object, wherein the one or more properties comprise one or more of: a velocity of the object, an acceleration of the object, a heading of the object, an object type of the object, a size of the object, or curvature information of the object.

Embodiment 13 is the method of any one of embodiments 1-12, wherein obtaining the historical data comprises obtaining only historical data that was generated when one or more properties of a state of the environment match properties of a current state of the environment when the agent is in the current geolocation.

Embodiment 14 is a method comprising:

determining a current geolocation of an agent within an environment;

obtaining historical data for the current geolocation of the agent from a database that maintains historical data for a plurality of geolocations within the environment, the historical data for each geolocation comprising a respective observation for each of one or more objects that were detected at the geolocation by sensors of a vehicle navigating through the environment, wherein each observation identifies at least (i) the object that was at the geolocation and (ii) a next geolocation that the object moved to after being at the geolocation; and generating a future trajectory for the agent based at least in part on the historical data.

Embodiment 15 is the method of embodiment 14, wherein the agent is a simulated agent used in a simulated version of the environment.

Embodiment 16 is the method of any one of embodiments 14 or 15, wherein the current geolocation is a specific voxel in an established voxel grid imposed on the environment.

Embodiment 17 is the method of any one of embodiments 14-16, wherein generating a future trajectory comprises:

for each respective observation, identifying a next geolocation that the object moved to after being at the geolocation; and computing a distribution over observed next geolocations.

Embodiment 18 is the method of embodiment 17, wherein generating a future trajectory further comprises:

sampling a single next geolocation from the distribution over observed next geolocations; and selecting the next geolocation as a next location in the future trajectory.

Embodiment 19 is the method of embodiment 18, wherein sampling a single next geolocation from the distribution over observed next geolocations comprises sampling from observed next geolocations with relatively low associated probabilities.

Embodiment 20 is the method of any one of embodiments 17-19, wherein generating a future trajectory further comprises:

obtaining a candidate future trajectory for the agent; and determining, using the distribution over observed next geolocations, whether the candidate future trajectory is a realistic future trajectory for the agent.

Embodiment 21 is the method of any one of embodiments 17-20, wherein generating a future trajectory for the agent based at least in part on the historical data comprises generating the future trajectory using an optimization-based planner that selects actions to be performed by the agent to optimize an objective function.

Embodiment 22 is the method of embodiment 21, wherein the objective function includes a first term that measures how likely a next geolocation in the future trajectory is according to the historical data, and wherein the optimization-based planner determines values of the first term for different actions based on the distribution over observed next geolocations.

Embodiment 23 is the method of any one of embodiments 14-22, wherein each observation also identifies (iii) one or more earlier geolocations that the object was at before moving to the current geolocation, and wherein obtaining the historical data comprises obtaining only observations that identify one or more earlier geolocations that match earlier geolocations of the agent.

Embodiment 24 is the method of any one of embodiments 14-23, wherein obtaining the historical data comprises obtaining only historical data that was generated when one or more properties of a state of the environment match properties of a current state of the environment when the agent is in the current geolocation.

Embodiment 25 is a system comprising: one or more computers and one or more storage devices storing instructions that are operable, when executed by the one or more computers, to cause the one or more computers to perform the method of any one of embodiments 1 to 24.

Embodiment 26 is one or more non-transitory computer storage media encoded with a computer program, the program comprising instructions that are operable, when executed by data processing apparatus, to cause the data processing apparatus to perform the method of any one of embodiments 1 to 24.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:

determining a current geolocation of an agent within an environment, wherein the current geolocation corresponds to a voxel of a voxel grid imposed on the environment, wherein the voxel represents a respective bounded three-dimensional region of the environment, wherein the agent is a simulated agent in a simulation of a real-world environment, and wherein the simulation of the real-world environment is for evaluating control software for an autonomous vehicle;

obtaining historical data for the voxel corresponding to the current geolocation of the agent from a database that maintains historical data for a plurality of voxels of the voxel grid, the historical data for each voxel comprising a respective trajectory for each of one or more objects that were detected at the voxel by sensors of a vehicle navigating through the environment, wherein each trajectory comprises one or more voxels at which the respective object was detected;

generating a future trajectory for the agent based at least in part on the historical data, comprising:

identifying, from the historical data, a plurality of trajectories, each trajectory corresponding to a respective agent and including the current geolocation for the agent;

identifying, from the historical data and for each of the plurality of identified trajectories, a respective observed next geolocation that follows the current geolocation in the identified trajectory, wherein the observed next geolocation corresponds to another voxel of the established voxel grid;

selecting an observed next geolocation from the plurality of observed next geolocations as a next location in the future trajectory; and including, in the simulation, the simulated agent following the future trajectory.

2. The method of claim 1, wherein identifying, for each of the plurality of identified trajectories, the respective observed next geolocation comprises:

for each respective identified trajectory, identifying a next geolocation that the object moved to after being at the current geolocation.

3. The method of claim 1, wherein selecting the respective observed next geolocation from the plurality of observed next geolocations as the next location in the future trajectory comprises:

computing a distribution over the plurality of observed next geolocations that assigns a respective probability to each of the plurality of observed next geolocations; and selecting the observed next geolocation from the plurality of observed next geolocations as the next location in the future trajectory based on the respective probabilities assigned to the observed next geolocations.

4. The method of claim 3, wherein selecting the observed next geolocation from the distribution over the plurality of observed next geolocations comprises sampling from the plurality of observed next geolocations by removing one or more observed next geolocations based on the respective probabilities assigned to the one or more observed next geolocation being below a threshold.

5. The method of claim 4, wherein generating the future trajectory for the agent based at least in part on the historical data comprises generating the future trajectory using an optimization-based planner that selects actions to be performed by the agent to optimize an objective function.

6. The method of claim 5, wherein the objective function includes a first term that measures how likely a next geolocation in the future trajectory is according to the historical data, and wherein the optimization-based planner determines values of the first term for different actions based on the distribution over observed next geolocations.

7. The method of claim 1, wherein identifying the plurality of trajectories comprises identifying only trajectories that, prior to the current geolocation, include one or more geolocations that match one or more earlier geolocations of the agent at which the agent was located prior to the current geolocation of the agent.

8. The method of claim 1, where identifying the plurality of trajectories comprises identifying only trajectories that were generated when one or more properties of a state of the environment match properties of a current state of the environment when the agent is in the current geolocation.

9. A system comprising one or more computers and one or more storage devices storing instructions that are operable, when executed by the one or more computers, to cause the one or more computers to perform operations comprising:

determining a current geolocation of an agent within an environment, wherein the current geolocation corresponds to a voxel of a voxel grid imposed on the environment, wherein the voxel represents a respective bounded three-dimensional region of the environment, wherein the agent is a simulated agent in a simulation of a real-world environment, and wherein the simulation of the real-world environment is for evaluating control software for an autonomous vehicle;

obtaining historical data for the voxel corresponding to the current geolocation of the agent from a database that maintains historical data for a plurality of voxels of the voxel grid, the historical data for each voxel comprising a respective trajectory for each of one or more objects that were detected at the voxel by sensors of a vehicle navigating through the environment, wherein each trajectory comprises one or more voxels at which the respective object was detected;

generating a future trajectory for the agent based at least in part on the historical data, comprising:

identifying, from the historical data, a plurality of trajectories, each trajectory corresponding to a respective agent and including the current geolocation for the agent;

identifying, from the historical data and for each of the plurality of identified trajectories, a respective observed next geolocation that follows the current geolocation in the identified trajectory;

computing a distribution over the plurality of observed next geolocations that assigns a respective probability to each of the plurality of observed next geolocations, wherein the observed next geolocation corresponds to another voxel of the established voxel grid; and selecting an observed next geolocation from the plurality of observed next geolocations as a next location in the future trajectory based on the respective probabilities assigned to the observed next geolocations; and including, in the simulation, the simulated agent following the future trajectory.

10. The system of claim 9, wherein identifying, for each of the plurality of identified trajectories, the respective observed next geolocation comprises:

for each respective identified trajectory, identifying a next geolocation that the object moved to after being at the current geolocation.

11. The system of claim 9, wherein generating the future trajectory further comprises:

sampling a single next geolocation from the distribution over the plurality of observed next geolocations.

12. One or more non-transitory computer storage media encoded with computer program instructions that when executed by a plurality of computers cause the plurality of computers to perform operations comprising:

determining a current geolocation of an agent within an environment, wherein the current geolocation corresponds to a voxel of a voxel grid imposed on the environment, wherein the voxel represents a respective bounded three-dimensional region of the environment, wherein the agent is a simulated agent in a simulation of a real-world environment, and wherein the simulation of the real-world environment is for evaluating control software for an autonomous vehicle;

obtaining historical data for the voxel corresponding to the current geolocation of the agent from a database that maintains historical data for a plurality of voxels of the voxel grid, the historical data for each voxel comprising a respective trajectory for each of one or more objects that were detected at the voxel by sensors of a vehicle navigating through the environment, wherein each trajectory comprises one or more voxels at which the respective object was detected; and generating a future trajectory for the agent based at least in part on the historical data, comprising:

identifying, from the historical data, a plurality of trajectories, each trajectory corresponding to a respective agent and including the current geolocation for the agent;

identifying, from the historical data and for each of the plurality of identified trajectories, a respective observed next geolocation that follows the current geolocation in the identified trajectory, wherein the observed next geolocation corresponds to another voxel of the established voxel grid;

selecting an observed next geolocation from the plurality of observed next geolocations as a next location in the future trajectory based on the respective probabilities assigned to the observed next geolocations; and including, in the simulation, the simulated agent following the future trajectory.

13. The one or more non-transitory computer storage media of claim 12, wherein identifying, for each of the plurality of identified trajectories, the respective observed next geolocation comprises:

for each respective identified trajectory, identifying a next geolocation that the object moved to after being at the current geolocation.

14. The one or more non-transitory computer storage media of claim 12, wherein generating the future trajectory further comprises:

sampling a single next geolocation from a distribution over the plurality of observed next geolocations.

15. The method of claim 1, wherein the historical data comprises data from sensors of a plurality of different vehicles.

16. The system of claim 9, wherein the historical data comprises data from sensors of a plurality of different vehicles.

17. The one or more non-transitory computer storage media of claim 12, wherein the historical data comprises data from sensors of a plurality of different vehicles.

* * * * *